Aug. 11, 1931.  H. P. HASTINGS  1,818,251

PORTABLE CABLE FUSE CUT-OUT

Filed Oct. 21, 1929

INVENTOR.
Harold P. Hastings
BY
Bodell + Thompson
ATTORNEYS.

Patented Aug. 11, 1931

1,818,251

UNITED STATES PATENT OFFICE

HAROLD P. HASTINGS, OF SYRACUSE, NEW YORK, ASSIGNOR TO CROUSE-HINDS COMPANY, OF SYRACUSE, NEW YORK, A CORPORATION OF NEW YORK

PORTABLE CABLE FUSE CUT-OUT

Application filed October 21, 1929. Serial No. 401,308.

This invention has for its object, a particularly simple and efficient means by which fuses are located in the wires of portable cables and the fuses and wires relieved of pulling force applied to the cable, or has for its object a particularly simple and efficient, what for brevity's sake is called, a portable cable fuse cut out intended to be used in the electric cable leading to portable electric tools, not only to protect the tools but also avoid blowing out of the fuses in the service wires of a building, so that if, during the use of the tool, because of conditions encountered by the tool, as when the tool stalls, the readily accessible fuse located in the portable cable will blow out instead of the main fuse located somewhere in the electric service system of the building.

The invention consists in the novel features and in the combinations and constructions hereinafter set forth and claimed.

In describing this invention, reference is had to the accompanying drawings, in which like characters designate corresponding parts in all the views.

Figure 1:
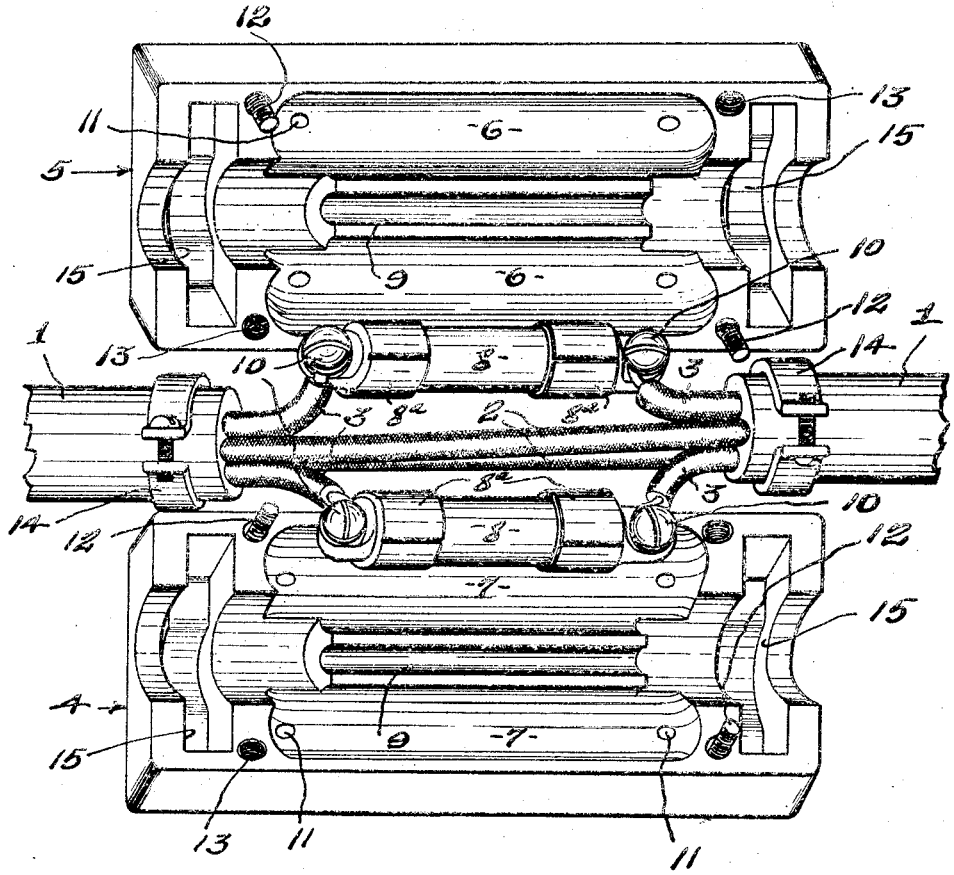
Figure 1 is a perspective view of this portable cable fuse cut out, the sections of the housing or box being shown as separated.
Figure 2:
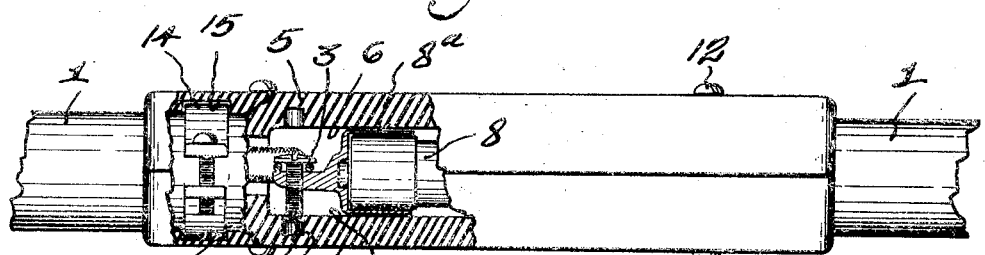
Figure 2 is an elevation, partly in section, of the portable fuse cut out assembled on the portable cable sections.

This portable fuse cut out comprises, generally, two separable box sections of any suitable insulating material, the sections having a recess for receiving a fuse, connectable to the ends of a cut wire projecting from the ends of the two separated sections of an electric cable and also a recess for a wire or wires that extend intact from one section to the other, the box sections having means for interlocking with the cable sections whereby the wires and the fuse are relieved of the pulling force applied to the cable, and means for securing the box sections together.

1 designates the sections of a cable and 2 and 3 stripped wires of the cable sections between said sections, the wires 3 being cut for connection to a fuse and the wires 2 being intact. These may be one, two, or more separate wires passing through the box intact.

4 and 5 designate the separable sections of a box, these sections being formed with complemental recesses 6 and 7 for receiving the fuses 8 and wires 3 and also with complemental grooves or recesses 9 for receiving wires 2.

As in the illustrated embodiment of my invention, a four wire system is shown in which two fuses 8 are used. There are two pairs of complemental recesses 6 and 7, one pair for each fuse. The fuse shown is a cartridge fuse and is engaged by sockets $8^a$ connected to the ends of the wire 3, the sockets being here shown as provided with binding devices including screws 10.

The box sections 4, 5 are provided with holes 11 for receiving the ends of the screws. The box sections are duplicates and hence the holes 11 are provided in both sections, although they need be provided only in one section. Obviously, by providing these holes in both sections, the wire man does not have to exercise any judgment in locating the screws 10. The box sections 4 and 5 are held assembled by fastening means as screws 12 threading into the holes 13 provided in the sections.

The means by which the wires 2, 3 and fuses 8 are relieved of tension or pulling force applied to the cable sections 1, 2 is here shown as comprising collars 14, clamped on the ends of the cable sections and recesses 15 formed in the box sections 4, 5 for receiving collars.

The box sections are also formed with cut outs in their end walls for embracing the cable sections.

In operation, the outer insulation of the cable is cut and stripped off the wires to expose them so that a fuse can be inserted in one or more of them, one or more wires as 3 cut, the sockets 9 attached to the ends thereof and the fuses placed in the sockets. The collars 14 are clamped on the ends of the cable sections. The box sections are then applied with the fuses lying in the recesses 6, 7 and the wires 2 in the grooves 9.

When, during the use of the portable tool, an overhead current occurs, the fuse 8 in the cable burns out without affecting any other electrical appliances connected in the service system. Obviously, a burned out fuse can be readily replaced by merely separating the box sections, taking out the burnt fuse, installing a new fuse, and again securing the box sections together.

What I claim is:

1. A fuse cut out for a cable having a plurality of wires, said cut out comprising a casing formed of complemental sections, each of said sections having a recess extending longitudinally and central of the section and being open at both ends for receiving a continuous run of the wire of the cable, a second recess extending parallel and to one side of the first recess and being closed at its ends for receiving a fuse element for connection to another wire of the cable, a transverse recess adjacent each end of the section for receiving a cable clamp and means for detachably holding the sections together.

2. The combination with sections of an electric cable and wires extending between the sections, one of the wires being cut and its ends separated and another extending intact from one section to the other, and a fuse connecting the wire ends, of a fuse cut out comprising separable box sections having recesses for receiving the said wires and the fuse and means for holding the box sections together, the box sections and the cable sections having means for interlocking to relieve the wires and fuse in the box from pulling force applied to the cable sections.

3. The combination with sections of an electric cable and wires extending between the sections, one of the wires being cut and its ends separated and another extending intact from one section to the other, and a fuse connecting the wire ends, of a fuse cut out comprising separable box sections having recesses for receiving the said wires and the fuse and means for holding the box sections together and collars clamped on the ends of the cable sections, the box sections having recesses for receiving and interlocking with the collars.

4. The combination with sections of an electric cable having stripped wires extending between the sections, one of the wires being cut and its ends separated and another wire extending intact from one section to the other, of sockets mounted on the separated ends of the wire and having screws for securing them to the ends of the wire, a cartridge fuse having its ends located in said sockets, box sections having recesses for receiving said wires, sockets and cartridge fuse, and additional recesses for receiving the ends of the screws, and means for securing the box sections together.

5. The combination with sections of an electric cable having stripped wires extending between the sections, one of the wires being cut and its ends separated and another wire extending intact from one section to the other, of sockets mounted on the separated wire ends and having screws for securing them to the wire ends, a cartridge fuse having its ends located in said sockets, box sections having recesses for receiving said wires, sockets and cartridge fuse, and additional recesses for receiving the ends of the screws, the cable sections and the box sections having means for interlocking for relieving the wires of pulling force applied to the cable sections, and means for securing the box sections together.

6. The combination with sections of an electric cable having stripped wires extending between the sections, one of the wires being cut and its ends separated and another wire extending intact from one section to the other, of sockets mounted on the separated wire ends and having screws for securing them to the wire ends, a cartridge fuse having its ends located in said sockets, box sections having recesses for receiving said wires, sockets and cartridge fuse, and additional recesses for receiving the ends of the screws and collars secured on the cable sections, the box sections having recesses at their ends for receiving and interlocking with the collars and means for securing the box sections together.

In testimony whereof, I have hereunto signed my name, at Syracuse, in the county of Onondaga and State of New York, this 11th day of October, 1929.

HAROLD P. HASTINGS.